United States Patent
Iijima (10) Patent No.: US 9,179,024 B2
(45) Date of Patent: Nov. 3, 2015

(54) MOVABLE HOUSING CONFIGURATION FOR AN IMAGE RECORDING DEVICE

(71) Applicant: Brother Kogyo Kabushiki Kaisha, Nagoya-shi, Aichi-ken (JP)

(72) Inventor: Shota Iijima, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/451,581

(22) Filed: Aug. 5, 2014

(65) Prior Publication Data

US 2015/0085049 A1 Mar. 26, 2015

(30) Foreign Application Priority Data

Sep. 25, 2013 (JP) .................................. 2013-198749

(51) Int. Cl.
*B41J 2/01* (2006.01)
*B65H 1/00* (2006.01)
*H04N 1/00* (2006.01)

(52) U.S. Cl.
CPC ....... *H04N 1/00533* (2013.01); *H04N 1/00543* (2013.01)

(58) Field of Classification Search
CPC .......... H04N 1/00533; H04N 1/00543; H04N 1/00525

USPC ................................................... 347/2, 3, 108
See application file for complete search history.

(56) References Cited

U.S. PATENT DOCUMENTS 7,552,922 B2* 6/2009 Terada .......................... 271/162

FOREIGN PATENT DOCUMENTS

| JP | H10-247051 A | 9/1998 |
| JP | 2004-354832 A | 12/2004 |

* cited by examiner

*Primary Examiner* — Juanita D Jackson
(74) *Attorney, Agent, or Firm* — Banner & Witcoff, Ltd.

(57) ABSTRACT

An image recording device may include first and second housings, where the second housing is movable relative to the first housing. For example, the second housing may move from a first position to a second position in a first direction away from one end portion of the first housing and from the second position to the first position in a second direction toward the one end portion. In the first position, the second housing may contact the first housing with a surface of the second housing facing an accommodating area. A portion of the second housing may be located behind the other end portion of the first housing in the second direction, when the second housing is in the first position. In the second position, the surface of the second housing may cover the other end portion of the first housing in a direction perpendicular to the second direction.

17 Claims, 6 Drawing Sheets

MOVABLE HOUSING CONFIGURATION FOR AN IMAGE RECORDING DEVICE

CROSS REFERENCE TO RELATED APPLICATION

This application claims priority from Japanese Patent Application No. 2013-198749, filed on Sep. 25, 2013, the entire disclosure of which is incorporated herein by reference.

BACKGROUND OF THE INVENTION

1. Field of the Invention

The present invention relates to an image recording device comprising a first housing and a second housing disposed above the first housing which accommodates a printer therein.

2. Description of Related Art

A known image recording device, e.g., a multi-function device (MFD), has a scanning function and a printing function. A housing of a scanner is disposed on a housing of a printer. In the printer, a path for a user to access a recording unit is required for removal of paper jam and maintenance. The housing of the scanner is configured to pivot or slide relative to the housing of the printer.

It may be beneficial for an image recording device to be configured to provide an adequate access path to a recording unit while reducing restrictions in layout of components of the image recording device.

SUMMARY OF THE INVENTION

According to an embodiment of the invention, an image recording device comprises a first housing and a second housing. The first housing defines an accommodating area including a sheet conveying unit and a recording unit. The first housing includes a first end portion and a second end portion which are opposite to each other in a horizontal direction. The second housing is movable from a first position to a second position in a first direction away from the second end portion of the first housing and from the second position to the first position in a second direction toward the second end portion. The first position is defined by the second housing at least partially contacting the first housing, a surface of the second housing facing the accommodating area defined by the first housing, and a portion of the second housing being located behind the first end portion of the first housing in the second direction. The second position is defined by the surface of the second housing facing and covering the first end portion of the first housing in a direction perpendicular to the second direction.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF EMBODIMENTS

Embodiments of the invention and their features and technical advantages may be understood by referring to FIGS. 1-6, like numerals being used for like corresponding parts in the various drawings.

In the following description, a top-bottom direction 7 is defined when a multi-function device (MFD) 10 is disposed in an orientation (shown in FIG. 1) in which it is intended to be used, and a front-rear direction 8 is defined such that a side having an opening 13 is positioned on the front side, and a right-left direction 9 is defined when the MDF 10 is viewed from the front side.

Figure 1:
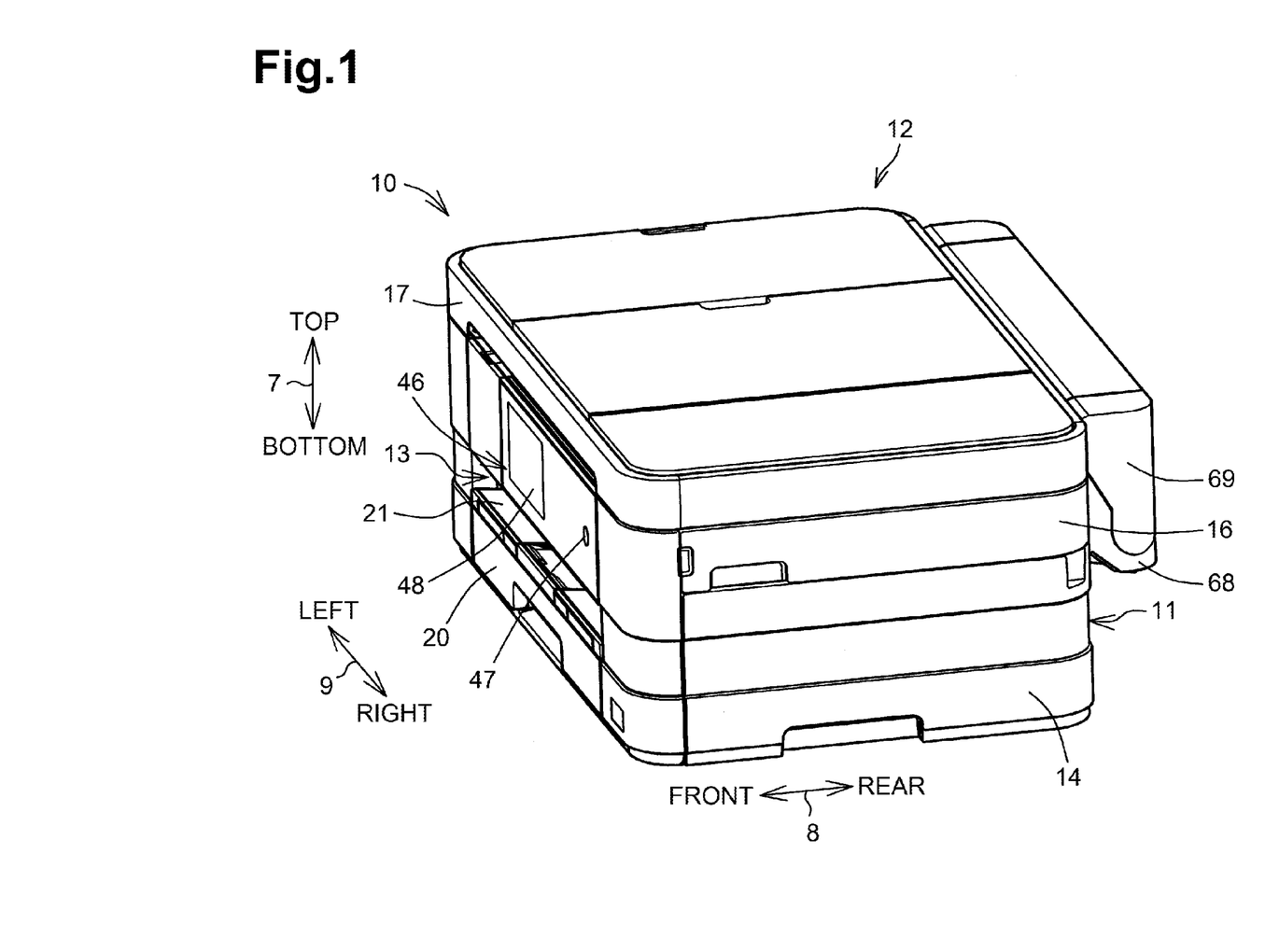
FIG. 1 is a perspective view of a multi-function device (MFD) when a housing of a scanner is in a first position, according to an embodiment of the invention.

As shown in FIG. 1, the MDF 10 has a generally rectangular parallelepiped shape and comprises an inkjet printer 11 configured to record an image on a sheet, e.g., a recording sheet. The MDF 10 has various functions such as a facsimile function and a printing function.

The printer 11 comprises a housing 14 which has, on its front side, an opening 13. A feed tray 20 and a discharge tray 21, which are configured to hold various sizes of sheets, are insertable into and removable from the housing 14 through the opening 13 along the front-rear direction 8. The housing 14 defines an accommodating area including the printer 11. The housing 14 is an example of a first housing.

Figure 2:
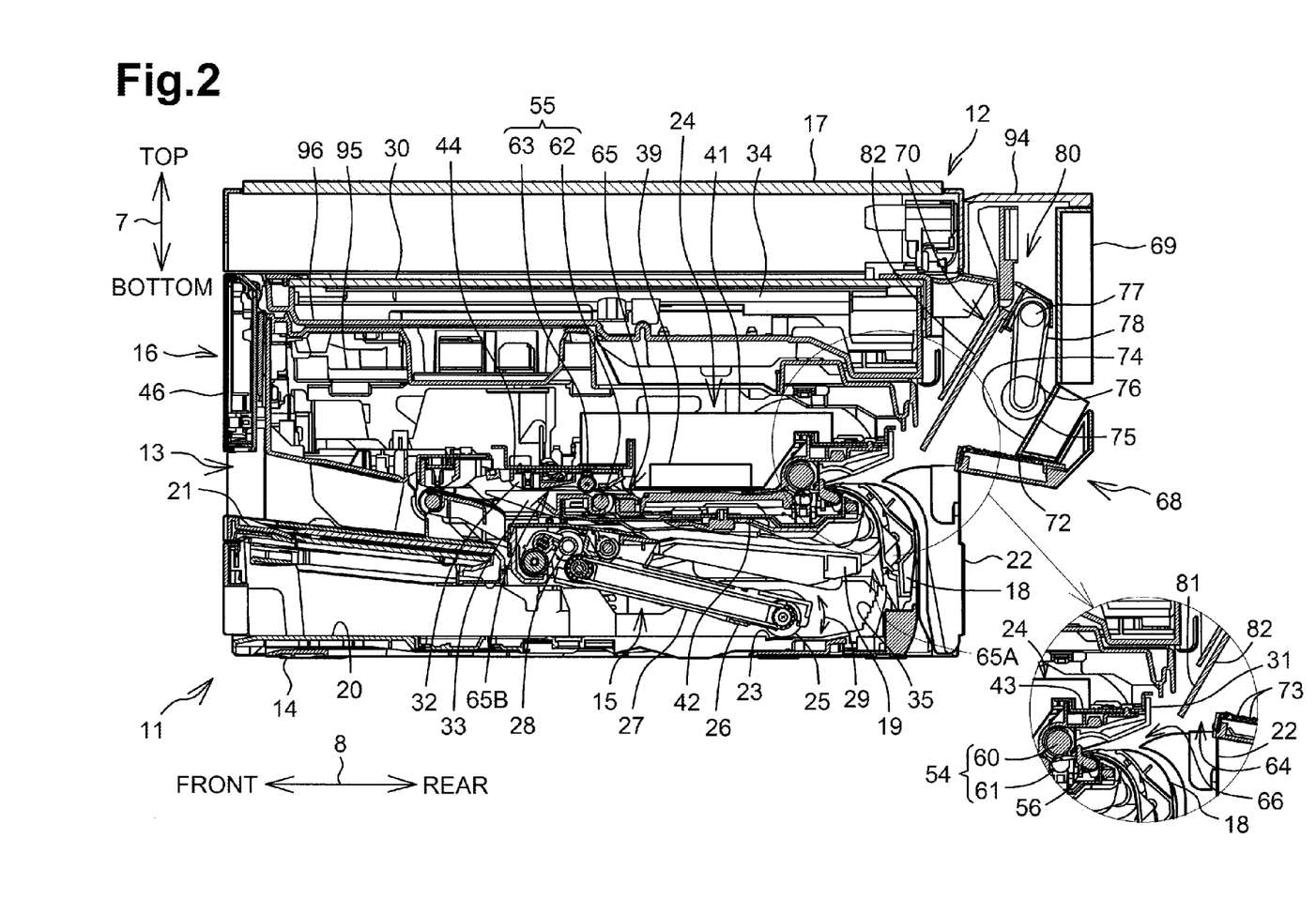
FIG. 2 is a cross-sectional view showing an internal structure of the MFD when the housing of the scanner is in the first position.

As shown in FIG. 2, the printer 11 comprises a sheet feeder 15 configured to feed a sheet, and a recording unit 24 configured to record an image on the sheet, a first convey roller pair 54, a second convey roller pair 55, and a control board 95.

As shown in FIG. 1, a scanner 12 is disposed above the printer 11. A housing 16 of the scanner 12 has the same dimensions in the front-rear direction 8 and in the left-right direction 9 as the housing 14 of the printer 11. The housing 14 of the printer 11 along with the housing 16 of the scanner 12 define an external shape of the MFD 10, which is generally rectangular parallelepiped. The housing 14 is open upward to allow access to the inside of the housing 14. The housing 16 is placed on the housing 14 to close the opening of the housing 14. The housing 16 is an example of a second housing.

As showing in FIG. 2, the scanner 12 is a flatbed scanner. The housing 16 accommodates therein an image sensor 34 for optically reading an image on a document. A platen glass 30 is disposed at the top of the housing 16 so as to be covered by a document cover 7. FIGS. 1 and 2 shows a state in which the platen glass 30 is covered by the document cover 17.

The document cover 17 is coupled to a rear portion of the housing 16 so as to pivot about an axis along the left-right direction 9. As shown in FIGS. 1 and 2, the document cover 17 contacts the top of the housing 16 to cover the platen glass 30. When a front side of the document cover 17 is raised from the state shown in FIGS. 1 and 2, the document cover 17 is pivoted to expose the platen glass 30. An automatic document feeder (ADF) for sequentially picking up documents to be read may be provided in the document cover 17.

An operation panel 46 is disposed above the opening 13 and at a front face of the MFD 10. The operation panel 46 is a flat panel and its largest face is exposed at the front face of the MFD 10. A dimension of the operation panel 46 along the left-right direction 9 is shorter than a dimension of the housing 14 or the housing 16 along the left-right direction 9. Opposite ends of the operation panel 46 in the left-right direction 9 are positioned inside of opposite ends of the housing 14 or the housing 16 in the left-right direction 9. A dimension of the operation panel 46 in the front-rear direction 8 is much shorter than a dimension of the housing 14 or the housing 16 in the front-rear direction 8. Although not shown in the figures, the operation panel 46 is supported, at opposite ends of its upper portion in the left-right direction 9, by the housing 14 so as to pivot frontward and upward about the supported portions. The front face of the operation panel 46 is generally flush with the front faces of the housing 14 and the housing 16 when a pivoting end of the operation panel 46 is at the lowest position.

The operation panel 46 is disposed to partially overlap the housing 16 of the scanner 12 in the top-bottom direction 7. More specifically, an upper portion of the operation panel 46 is positioned above a bottom wall 96 of the housing 16 in the top-bottom direction 7. An upper end of the operation panel 46 is generally level with the platen glass 30 (shown in FIG. 2), and the document cover 17 of the scanner 12 is disposed above the operation panel 46. A partial overlap of the operation panel 46 and the housing 16, as described herein, means the following. When the operation panel 46 extends over a first range in an axis along the top-bottom direction 7 and when the housing 16 extends over a second range in the axis along the top-bottom direction 7, the first range partially overlaps the second range. Therefore, a partial overlap of the operation panel 46 and the housing 16 in the top-bottom direction 7 is achieved even when the position of the operation panel 46 is entirely distinct from the position of housing 16 in the front-rear direction 8 and/or in the left-right direction 9.

The operation panel 46 is located at a front end portion of the housing 14 of the printer 11. A portion of the housing 16 of the scanner 12 is located behind the operation panel 46 in the front-rear direction 8. The operation panel 46 is an example of a first end portion.

The operation panel 46 comprises, on its front face, a power button 47 and a touch panel 48. The touch panel 48 displays information about operations of the printer 11 and the scanner 12, and an input screen configured to receive user input to the printer 11 and the scanner 12. Input made through the touch panel 48 is output, as input information, to the control board 95. The power button 47 and the touch panel 48 are each an example of an input unit, and the touch panel 48 is an example of a display unit.

[Printer 11]

A structure of the printer 11 will be described in detail below.

[Sheet Feeder 15]

As shown in FIG. 2, the sheet feeder 15 comprises a feed roller 25, a drive transmission mechanism 27, and a separation pad 23. The sheet feeder 15 is disposed above the feed tray 20 and below the recording unit 24. The feed roller 25 is rotatably supported by a distal end of the feed arm 26. The feed arm 26 pivots about a shaft 28 at a proximal end of the feed arm 26 in directions shown by arrows 29 such that the feed roller 25 moves into contact with and away from a bottom surface of the feed tray 20. The feed roller 25 is configured to contact the sheet held on the feed tray 20. The separation pad 23 is disposed on the bottom surface of the feed tray 20 at a position opposing the feed roller 25. The separation pad 23 has a greater friction coefficient than that of the bottom surface of the feed tray 20.

As shown in FIG. 2, the feed tray 20 has a shape of box with its top open, and its dimension in the front-rear direction 8 is longer than its dimension in the top-bottom direction 7. The discharge tray 21 is disposed on the front side of the feed tray 20. Various sizes of sheets, such as A4 sheets and L photopaper (according to Japanese Industrial Standards (JIS)), may be placed on the feed tray 20. The feed tray 20 is accommodated in an inner space which communicates with the opening 13 of the housing 14. The feed tray 20 is configured to advance and retract relative to the housing 14 along the front-rear direction 8 through the opening 13.

The feed roller 25 is driven by a motor (not shown) through the drive transmission mechanism 27. The drive transmission mechanism 27 has an endless belt for transmitting rotation of the shaft 28 to a shaft of the feed roller 25. When the feed roller 25 rotates while contacting an uppermost one of the sheets held on the bottom surface of the feed tray 20, the uppermost sheet is fed to a conveying path 65 (curved path 65A). A separation member 35, which is disposed at the rear of the feed tray in the front-rear direction 8, receives leading edges of the sheets, thereby to prevent lower sheets in the feed tray 20 than the uppermost sheet from being fed together with the uppermost sheet. The separation pad 23 prevents a lowermost sheet from being fed together with an upper sheet by a friction force generated therebetween.

[Conveying Path 65]

As shown in FIG. 2, the conveying path 65 is defined in the housing 14 to extend upward from the rear of the feed tray 20 in a U-turn shape and extends frontward from the rear of the printer 11 to the discharge tray 21 in a generally strait manner. A curved path 65A and a straight path 65B are defined as a part of the conveying path 65.

The curved path 65A is defined by an outer guide member 18, an inner guide member 19, and a guide member 31 which oppose one another with a space therebetween so as to allow passage of a sheet. The straight path 65B is defined by the recording unit 24, a platen 42, a guide member 32, and a guide member 33 which oppose one another with a space therebetween so as to allow passage of a sheet.

A sheet fed by the feed roller 25 from the feed tray 20 to the conveying path 65 is guided upward along the curved path 65A while the conveying direction is reversed, and is further guided frontward along the straight path 65B.

The outer guide member 18 has an outer guide surface partially defining the curved path 65A. The inner guide member 19 has an inner guide surface partially defining the curved path 65A. Each guide surface may be formed by a single surface or by end faces of a plurality of ribs.

The guide member 31 is disposed above the inner guide member 19 at a position directly upstream of (rearward of) the first convey roller pair 54. The outer guide member 18 and the inner guide member 19 also define a bypass path 66, which will be described later.

[Rear Face Cover 22]

A rear face cover 22 partially defines a rear face of the housing 14 and supports the outer guide member 18. The rear face cover 22 is pivotally supported, at its right and left lower ends, by the housing 14. The rear face cover 22 is pivotable, with its top tilting rearward, about a pivot axis which extends along the left-right direction 9 at a lower portion of the rear face cover 22, so as to expose the conveying path 65 and the bypass path 66 to the outside of the printer 11.

Similarly to the rear face cover 22, the outer guide member 18 is pivotally supported, at its right and left lower ends, by the housing 14. When the rear face cover 22 is open, the outer guide member 18 is pivotable, with its top tilting rearward, about a pivot axis which extends along the left-right direction 9. By opening the rear face cover 22, the curved path 65A is exposed. When the rear face cover 22 is closed so as to stand up, the rear face cover 22 supports the outer guide member 18 from behind. The outer guide member 18 kept in a stand-up position by the rear face cover 22 opposes the inner guide member 19 to define the curved path 65 therebetween.

[First Convey Roller Pair 54 and Second Convey Roller Pair 55]

As shown in FIG. 2, the first convey roller pair 54 is disposed to the conveying path 65 at a position upstream of the recording unit 24 in the conveying direction (i.e. at a position rearward of the recording unit 24 in the front-rear direction 8). The first convey roller pair 54 includes a first convey roller 60 and a pinch roller 61. The second convey roller pair 55 is disposed to the conveying path 65 at a position downstream of the recording unit 24. The second convey roller pair 55 includes a second convey roller 62 and a spur 63. The first convey roller 60 and the second convey roller 62 are driven by a motor (not shown). The first convey roller 60 and the second convey roller 62 rotate to convey the sheet, which is nipped between the first convey roller pair 54 and the second convey roller pair 55. The first convey roller pair 54 and the second convey roller pair 55 are each an example of a sheet conveying unit.

[Recording Unit 24]

As shown in FIG. 2, the recording unit 24 is disposed between the first convey roller pair 54 and the second convey roller pair 55 and opposes the platen from above to define the straight path 65B therebetween. The recording unit 24 comprises a carriage 41 and a recording head 39. The carriage 41 is supported by guide rails 43, 44 disposed at the rear and front of the platen 42, respectively. A known belt mechanism is provided to the guide rails 44. The carriage 41 is coupled to an endless belt of the belt mechanism and reciprocates in the left-right direction 9 along the guide rails 43, 44 by rotation of the endless belt.

The recording head 39 is mounted on the carriage 41. A plurality of nozzles (not shown) are formed in a lower surface of the recording head 39. Ink is supplied from an ink cartridge (not shown) to the recording head 39. The recording head 39 selectively ejects ink droplets from the nozzles when the carriage 41 reciprocates in the left-right direction 9. Ink droplets ejected from the nozzles strike the sheet on the platen 42, thereby to form an image on the sheet.

[Bypass Path 66]

An opening 64 is defined above the rear face cover 22 at the rear of the housing 14. The bypass path 66 is defined in the housing 14 to extend from the opening 64 to the first convey roller pair 54. The bypass path 66 extends from the rear to the front in the front-rear direction obliquely downward. The guide member 31 has an upper guide surface defining the bypass path from above. The outer guide member 18 and the rear face cover 22 have a lower guide surface defining the bypass path from below. The curved path 65A and the straight path 65B are defined below the bypass path 66. The outer guide member 18 and the rear face cover 22 are pivotable with their top tilting rearward, so as to expose the conveying path 65 and he bypass path 66.

A sheet placed on a bypass tray 70 or a manual feed tray 80 is guided obliquely downward along the bypass path 66 and enters the straight path 65B of the conveying path 65. The sheet is conveyed by the first convey roller pair 54 to the recording unit 24, and the sheet having an image recorded thereon is discharged onto the discharged tray 21. The sheet placed on the bypass tray 70 or the manual feed tray 80 is conveyed along a path which is generally straight.

[Bypass Tray 70 and Manual Feed Tray 80]

As shown in FIG. 2, the bypass tray 70 and the manual feed tray 80 are disposed at the rear of the MFD 10. The bypass tray 70 and the manual feed tray 80 hold one or more sheets, separately from the feed tray 20. The bypass tray 70 and the manual feed tray 80 are arranged in the top-bottom direction 7 while the manual feed tray 80 is above the bypass path 70. The bypass tray 70 and the manual feed tray 80 are each an example of a sheet tray.

As shown in FIGS. 1 and 2, a stationary member 68 is disposed at the rear of the housing 16 of the scanner 12 and extends downward to cover the opening 64. The stationary member 68 forms a downstream portion, in the conveying direction, of the bypass tray 70 and the manual feed tray 80. A movable member 69 is pivotally disposed above the stationary member 68. The stationary member 68 and the movable member 69 constitute the bypass tray 70 and the manual feed tray 80.

As shown in FIG. 2, a separation member 72 is disposed at a lower portion of the stationary member 68. The separation member 72 is positioned at a height, in the top-bottom direction 7, to partially define the opening 64 and extends obliquely downward from the opening 64. Leading edges of sheets held by the bypass tray 70 contact an upper surface of the separation member 72. A plurality of teeth (not shown) are arranged on the upper surface of the separation member 72 in the front-rear direction 8 and protrude upward from the upper surface. The teeth 73 separate, one from the other, the leading edges of the sheets held by the bypass tray 70.

A holding member 75 defining a holding surface 74 of the bypass tray 70 is disposed above the separation member 72 and rearward of the opening 64. The holding surface 74 is inclined relative to a mounting surface on which the MFD is mounted. The holding surface 74 is generally parallel with a holding surface 81 of a holding member 82 of the manual feed tray 80.

A drive shaft 77 of a feed roller 76 is disposed near an upper end of the holding member 82 and on an opposite side from the holding surface 81. The drive shaft 77 is driven to rotate by a roller (not shown). An arm 78 is supported at its one end by the drive shaft 77 and the feed roller 76 is rotatably supported by the other end of the arm 78. The arm 78 extends from the drive shaft 77 downward toward the holding surface 74 of the holding member 75. The arm 78 is disposed at a center of the stationary member 68 in the left-right direction 9. The arm 78 is pivotable about the drive shaft 77.

The feed roller 76 is disposed at a pivoting end of the arm 78. The feed roller 76 is connected to the drive shaft 77 through an endless belt (not shown). The endless belt 77 transmits rotation of the drive shaft 77 to the feed roller 76. When the feed roller 76 rotates while contacting an uppermost one of the sheets held on the holding surface 74 of the bypass tray 70, the uppermost sheet is fed to the bypass path 66. Sheets under the uppermost sheet are separated from the uppermost sheet by the teeth of the separation member 72 and remained in the bypass tray 70.

As shown in FIG. 2, the movable member 69 is pivotally coupled to the top of the stationary member 68. As shown in FIGS. 1 and 2, the movable member 69 is pivotable between a standing position in which the movable member 69 stands along the top-bottom direction 7 and an inclined position in which the movable member 69 is inclined relative to the top-bottom direction 7. When the bypass tray 70 and the manual feed tray 80 are not in use, the movable member 69 is in the standing position and occupies a less space at the rear of the housing 14 than in the inclined position. A rear surface of the movable member 69 in the standing position is generally parallel to a rear surface of the housing 14. The bypass tray 70 and the manual feed tray 80 are put in use by inclining the movable member 69 outwardly of the housing 14 so as to extend obliquely upward. The movable member 69 is selectively operated by the user between the standing position and the inclined position.

A tray cover 94 is pivotally supported at an upper end of the movable member 69. The tray cover 94 has a flat plate shape and covers openings at upper ends of the bypass tray 70 and the manual feed tray 80. As shown in FIGS. 1 and 2, the tray cover 94 is pivotable to cover the openings at the upper ends of the bypass tray 70 and the manual feed tray 80 when the movable member 69 is in the standing position and to expose the openings when the movable member 69 is in the inclined position. When the tray cover 94 is in a position to expose the openings, the tray cover 94 extends obliquely upward on a line extended from the holding surface 74 so as to hold an upper edge of a sheet protruding from an upper end of the movable member 69.

[Control Board 95]

The control board 95 is disposed inside the housing 14 of the printer 11 at a position frontward of the recording unit 24. The control board 95 is disposed at an upper portion of the housing 14 to be exposed upward through the opening of the housing 14. When the housing 16 is in a first position (shown in FIG. 3) in which the housing 16 is placed on and covers the housing 14, the control board 95 is below the bottom wall 96 of the housing 16 in the top-bottom direction 7. The control board includes a CPU (central processing unit), a ROM (read only memory), and a RAM (random access memory) that are mounted thereon. The control board 95 is electrically connected to the motors of the printer 11 and the recording unit 24. The motors and the recording unit 24 are driven at predetermined timings to perform image recording. The control board 95 is also electrically connected to a scanner control board (not shown) for controlling the scanner 12 and a panel board (not shown) for outputting input signals based on inputs to the operation panel 46.

[Link Member 101]

Figure 4:
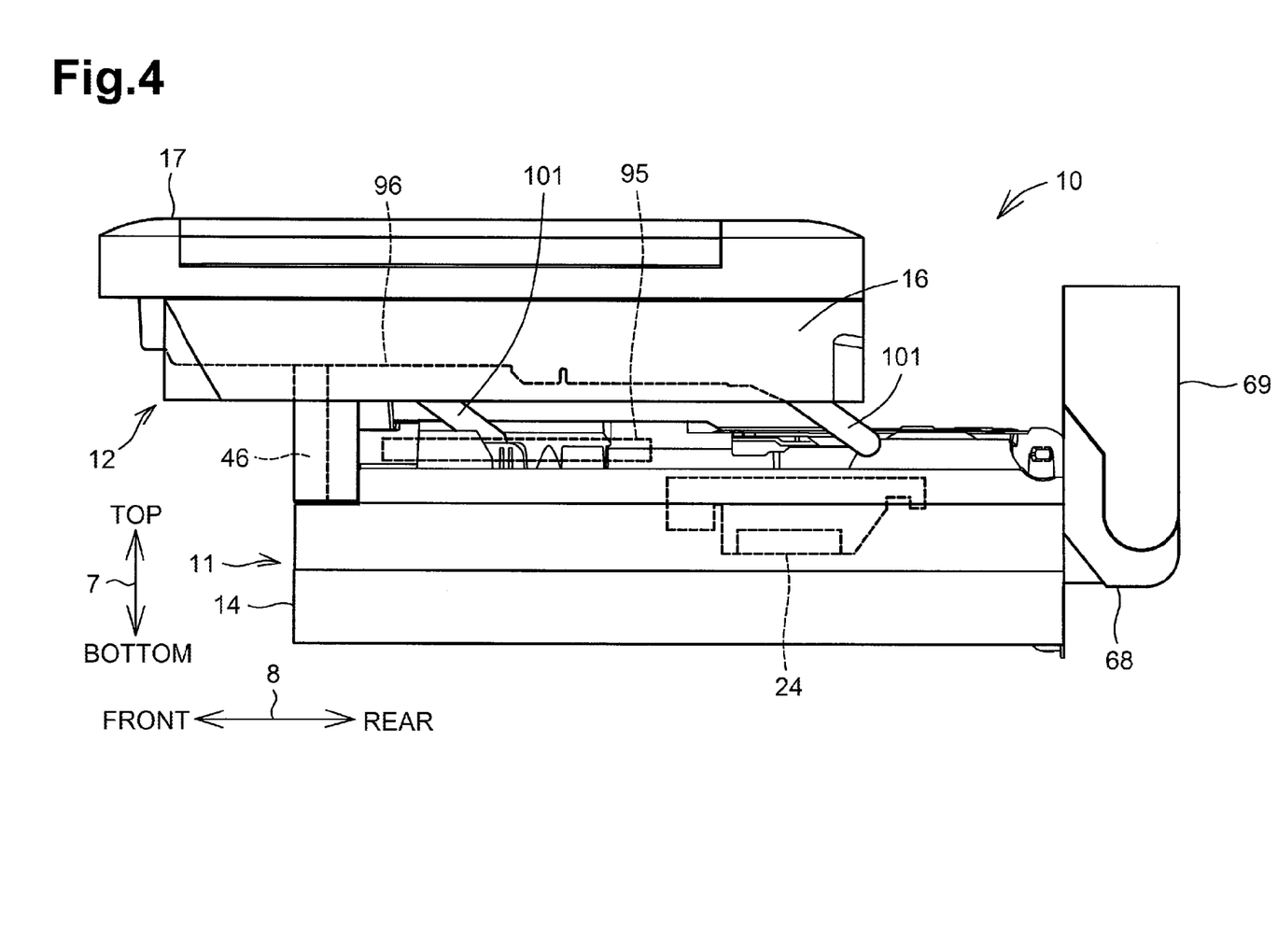
FIG. 4 is a side view of the MFD when the housing of the scanner is in a second position.
Figure 5:
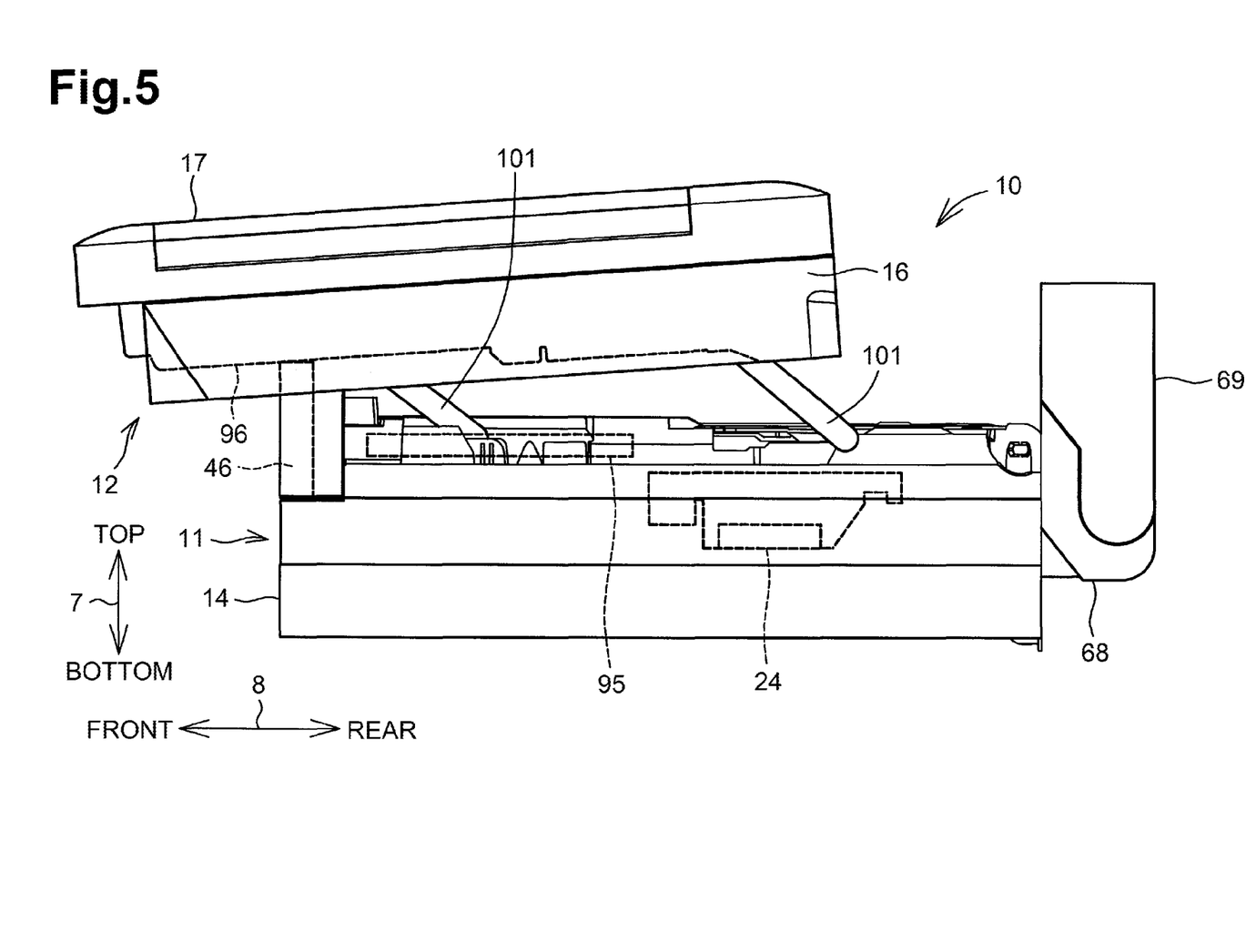
FIG. 5 is a side view of a MFD when a housing of a scanner is in a second position, according to another embodiment of the invention.
Figure 6:
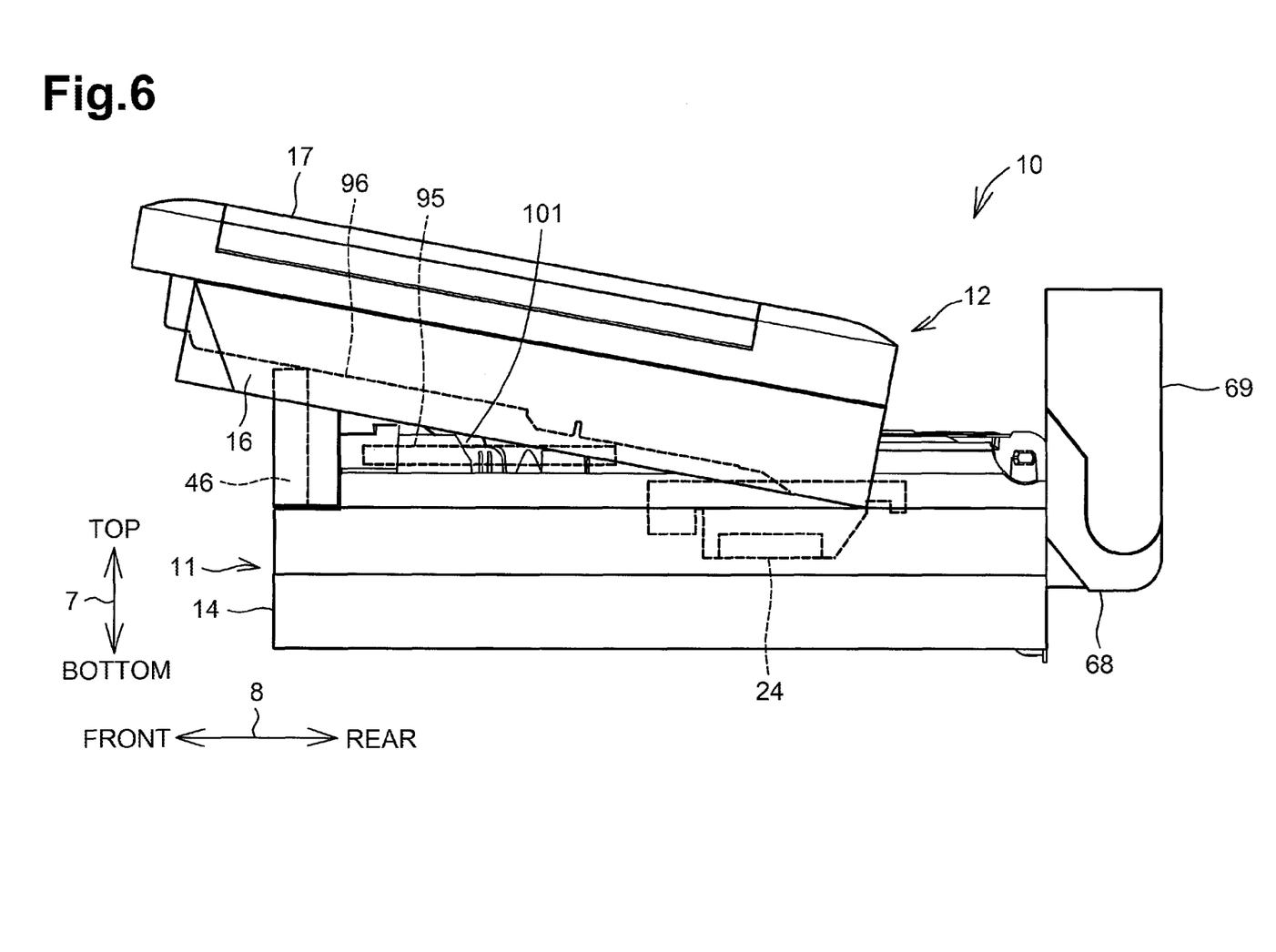
FIG. 6 is a side view of a MFD when a housing of a scanner is in a second position, according to another embodiment of the invention.

As shown in FIG. 4, the housing 14 of the printer 11 and the housing 16 of the scanner 12 are linked by four link members 101. A pair of link members 101 is disposed on each one of opposite sides of the housing 14 or the housing 16 in the left-right direction 9. Two link members 101 of each pair are spaced from each other in the front-rear direction 8. The four link members 101 are disposed at different positions but have the same shape, which is an elongated flat plate shape. Each link member 101 has such a length that the housing 16 is movable to a position above the operation panel 46.

One end of each link member 101 is coupled to the housing 14 pivotally about an axis extending in the left-right direction 9, and the other end of the link member 101 is coupled to the housing 16 pivotally about an axis extending in the left-right direction 9. A parallel link mechanism is formed by a pair of link members 101 on each one of opposite sides of the housing 14 or the housing 16 in the left-right direction 9. Two link members 101 of each pair pivot in parallel on each one of opposite sides of the housing 14 or the housing 16 in the left-right direction 9. When the housing 16 is in the first position in which the housing 16 covers the top of the housing 14, one end of each link member 101 coupled to the housing 14 is positioned more front in the front-rear direction 8 than the other end of the link member 101 coupled to the housing 16.

[Movement of Housing 16]

Figure 3:
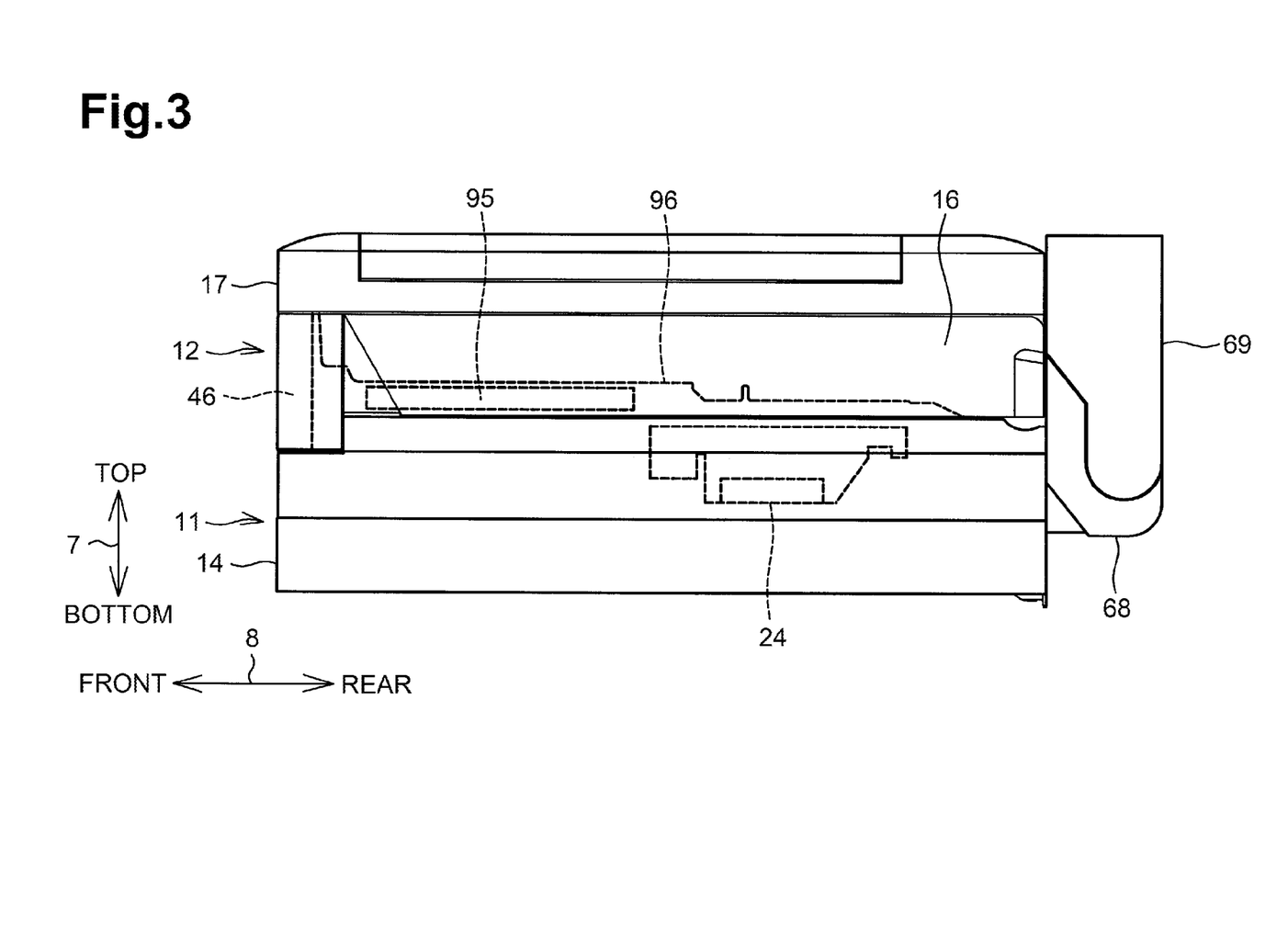
FIG. 3 is a side view of the MFD when the housing of the scanner is in the first position.

The housing 16 of the scanner 12 is movable, relative to the housing 14 of the printer 11, frontward in the front-rear direction 8 and upward in the top-bottom direction 7 from a position in which the housing 16 is placed on the housing 14. As shown in FIG. 3, the housing 16 is placed on the housing 14 to close an upward opening of the housing 14 when the printer 11 performs image recording and when the scanner 12 performs image reading. The position of the housing 16 shown in FIG. 3 is referred to as the first position. The housing 16 in the first position closes the opening of the housing 14. Thus, the housing 16 covers from above the recording unit 24 and the control board 95. This disables the user from accessing the recording unit 24 and the control board 95. In the first position, a portion of a lower portion of the housing 16 than the document cover 17 overlaps the operation panel 46 in the top-bottom direction 7.

In other words, when the housing 16 is in the first position, a portion of a lower portion of the housing 16 than the document cover 17 is behind the operation panel 46 in the front-rear direction 8.

The recording unit 24 needs to be accessed by the user for removal of paper jam and maintenance. In order to access the recording unit 24, the user moves the housing 16 positioned in the first position frontward in the front-rear direction 8 and upward in the top-bottom direction 7. The housing 14 and the housing 16 are linked by the four link members 101. Thus, in response to movement of the housing 16, each link member 101 pivots such that one end of the link member 101 coupled to the housing 16 is positioned more front in the front-rear direction 8 and more upper in the top-bottom direction 7 than the other end of the link member 101 coupled to the housing 14. The housing 16 moves in a circular arc from the first position to the second position while two link members of each pair remain parallel to each other.

The link members 101 translate the housing 16 from the first position to the second position. More specifically, the link members 101 guide the housing 16 from the first position to the second position while maintaining the housing 16 in a horizontal orientation relative to the housing 14.

As shown in FIG. 4, circular movement of the housing 16 is stopped when the housing 16 reaches a position directly above the operation panel 46 in which the bottom wall 96 of the housing 16 contacts an upper end of the operation panel 46. The position of the housing 16 shown in FIG. 4 is referred to as a second position. When the housing 16 is in the second position, the housing 14 and the housing 16 are spaced from each other in the top-bottom direction 7, and a front portion of the housing 16 is positioned directly above the operation panel 46. A rear portion of the housing 16 in the second position is directly above or frontward of the recording unit 24, which is positioned closer to the rear of the housing 14 than the control board 95. At the same time, the front portion of the housing 16 is positioned directly above the control board 95, which is positioned closer to the front of the housing 14 than the recording unit 24. This allows the user to readily access the recording unit 24 in the housing 14 from above, and prevents the user to access the control board 95 in the housing 14. The housing 16 in the second position may be supported by the housing 14 or the operation panel 46, or alternatively by the link members 101 stopped at their pivoting ends.

When the housing 16 is in the first position, the housing 16 partially contact the housing 14, the bottom wall 96 of the housing 16 faces, in the top-bottom direction 7, the accommodating area defined by the housing 14, and a portion of the housing 16 is located behind the operation panel 46 in the front-rear direction 8. When the housing 16 is in the second position, the bottom wall 96 of the housing 16 faces and covers the operation panel 46 in the top-bottom direction 7, and the housing 16 extends frontward beyond the operation panel 46.

[Effects of Embodiment]

In the above-described embodiment, when the housing 16 is moved into the second position, the housing 14 is opened upward, thereby to allow the user to access the recording unit 24. When the housing 16 is in the second position, the front portion of the housing 16 is directly above the operation panel 46, and the front end of housing 16 is frontward of the operation panel 46. This may enlarge an access path to the recording unit 24 and reduce restrictions in layout of the operation panel 46, which is a component of the MFD.

The recording unit 24 is disposed rearward of the operation panel 46. The housing 16 is moved into the second position by being moved frontward. Thus, when the housing 16 is in the second position, a relatively wide access path to the recording unit 24 may be defined.

The housing 16 covers the control board 95 from above when the housing 16 is in the first position and the second position. This may prevent the user to access the control board 95 even when the housing 16 is in the second position.

The housing 16 moves relative to the housing 14 in the front-rear direction 8. Two link members 101 are arranged in a pair in the front-rear direction 8 on each side of the housing 14 or the housing 16 in the left-right direction 9. Each link member 101 is pivotally coupled to the housing 14 and the housing 16. A parallel link mechanism, which is formed relatively simply by the link members 101, allows the housing 16 to move smoothly.

The bypass tray 70 and the manual feed tray 80 are disposed in the housing 14 on an opposite side of the operation panel 66 in the front-rear direction 8. Thus, the bypass tray 70 and the manual feed tray 80 does not interfere with the housing 16 moving relative to the housing 14.

[Other Embodiments]

Although, in the above-described embodiment, the housing 16 is a housing of the scanner 12, the scanner 12 may not be provided to the MFD, i.e., an image recording device, and the housing 16 may be disposed as a cover on the housing 14 so as to be openable for removal of paper jam and maintenance.

Although, in the above-described embodiment, the operation panel 46 is disposed at the front face of the housing 14, other components of the printer 11, such as a slot unit for reading various recording media, and USB connectors for connecting to external devices including a cellular phone and a smartphone may be disposed at the front face of the housing 14.

Although, in the above-described embodiment, the housing 16 is movable relative to the housing 14 frontward in the front-rear direction 8, the housing 16 may be movable rearward in the front-rear direction 8. When the housing 16 is moved to a position directly above the bypass tray 70 and the manual feed tray 80, the positional relationship between the recording unit 24 and the control board 95 in the housing 14 in the front-rear direction 8 should be opposite. Specifically, the printing unit 24 should be disposed closer, in the front-rear direction 8, to the front of the housing 14 than the control board 95.

In the above-described embodiment, the four link members 101 have the same shape. However, in another embodiment shown in FIG. 5, two link members 101 disposed closer to an operation panel 46 than the other two members 101 may have a greater longitudinal length than the other two link members 101. Accordingly, a housing 16 in the second position is inclined such that the front end thereof is positioned below the rear end thereof, thereby to expose the recording unit 24 upward relatively widely.

In the above-described embodiment, the link members 101 are provided four in total. However, in another embodiment shown in FIG. 6, only a pair of link members 101 may be disposed in the left-right direction 9 at a position relatively close to the operation panel 46. When a housing 16 is moved from the first position to the second position, the front of the housing 16 is raised, by the pair of link members 101, above the operation panel 46 so as to extend beyond the operation panel 46. At this time, the rear of the housing 16 slides frontward while being supported by an upper surface of a housing 14. The housing 16 in the second position is stably supported by the operation panel 16 and the housing 14.

As in the above-described embodiment and alternative embodiments, a portion of the housing 16 in the first position which overlaps the operation panel 46 in the top-bottom direction 7 but not in the left-right direction 9 may not be necessarily positioned above the operation panel 46 when the housing 16 is in the second position. In other words, a portion of the housing 16 in the first position which is not positioned behind the operation panel 46 in the front-rear direction 8 may not be necessarily positioned above the operation panel 46 when the housing 16 is in the second position.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image recording device comprising:
   a first housing defining an accommodating area including a sheet conveying unit and a recording unit, the first housing including a first end portion and a second end portion which are opposite to each other in a horizontal direction; and
   a second housing movable from a first position to a second position in a first direction away from the second end portion of the first housing and from the second position to the first position in a second direction toward the second end portion, wherein the first direction includes a horizontal component and a vertical component perpendicular to the horizontal direction,
   the first position being defined by the second housing at least partially contacting the first housing, a surface of the second housing facing the accommodating area defined by the first housing, and a portion of the second housing being located behind the first end portion of the first housing in the second direction, and
   the second position being defined by the surface of the second housing facing and covering the first end portion of the first housing in a direction perpendicular to the second direction.

2. The image recording device according to claim 1, wherein the first end portion is closer to a first end of the first housing than the recording unit.

3. The image recording device according to claim 1, wherein the second housing is supported by the first end portion when the second housing is in the second position.

4. The image recording device according to claim 3, wherein the second housing is supported by the first housing when the second housing is in the second position.

5. The image recording device according to claim 1, further comprising a movement guide configured to guide the second housing from the first position to the second position.

6. The image recording device according to claim 5, wherein the movement guide comprises link members each pivotally coupled to the first housing and the second housing, the link members being disposed on opposite sides of the first housing in a direction perpendicular to the horizontal direction.

7. The image recording device according to claim 6, wherein the link members include a first link member and a second link member, the first and second link members being arranged side by side in the horizontal direction and configured to move in parallel to each other.

8. The image recording device according to claim 6, wherein the link members include a first link member and a second link member, the first link member being disposed closer to the first end portion and farther from the recording unit than the second link member, and the first link member having a greater longitudinal length than the second link member.

9. The image recording device according to claim 5, wherein the movement guide is configured to translate the second housing between the first position and the second position.

10. The image recording device according to claim 5, wherein the movement guide is configured to guide the second housing from the first position to the second position while maintaining the second housing in a horizontal orientation relative to the first housing.

11. The image recording device according to claim 5, wherein the movement guide is configured to guide the second housing from the first position to the second position while inclining the second housing relative to the first housing.

12. The image recording device according to claim 1, wherein the second housing accommodates a scanner therein.

13. The image recording device according to claim 1, wherein the first end portion comprises at least one of an input unit configured to receive user input and a display unit configured to display information.

14. The image recording device according to claim 1, further comprising a sheet tray disposed at the second end portion of the first housing.

15. The image recording device according to claim 1, wherein the second housing extends beyond the first end portion in the horizontal direction when the second housing is in the second position.

16. An image recording device comprising:
a first housing defining an accommodating area including a sheet conveying unit and a recording unit, the first housing including a first end portion and a second end portion which are opposite to each other in a horizontal direction, the first housing further having an opening; and
a second housing movable from a first position to a second position in a first direction away from the second end portion of the first housing and from the second position to the first position in a second direction toward the second end portion,
the first position being defined by the second housing at least partially contacting the first housing and covering the recording unit from above, a surface of the second housing facing the accommodating area defined by the first housing, and a portion of the second housing being located behind the first end portion of the first housing in the second direction, and
the second position being defined by the surface of the second housing facing and covering the first end portion of the first housing in a direction perpendicular to the second direction, and the recording unit being exposed upwardly.

17. An image recording device comprising:
a control board configured to control operations of a sheet conveying unit and a recording unit;
a first housing defining an accommodating area including the sheet conveying unit and the recording unit, the first housing including a first end portion and a second end portion which are opposite to each other in a horizontal direction; and
a second housing movable from a first position to a second position in a first direction away from the second end portion of the first housing and from the second position to the first position in a second direction toward the second end portion,
the first position being defined by the second housing at least partially contacting the first housing, a surface of the second housing facing the accommodating area defined by the first housing, and a portion of the second housing being located behind the first end portion of the first housing in the second direction, and
the second position being defined by the surface of the second housing facing and covering the first end portion of the first housing in a direction perpendicular to the second direction,
wherein the second housing is configured to cover the control board from above both when the second housing is in the first position and when the second housing is in the second position.

* * * * *